(12) United States Patent
Teng et al.

(10) Patent No.: US 7,793,018 B1
(45) Date of Patent: Sep. 7, 2010

(54) PERSONALIZED MULTIMEDIA DISPLAY/DIGITAL TV FOR MULTI-TASKING

(75) Inventors: Tianbing Brian Teng, Beaverton, OR (US); Yan Mark Liu, Beaverton, OR (US)

(73) Assignee: Pixelworks, Inc., Portland, OR (US)

( * ) Notice: Subject to any disclaimer, the term of this patent is extended or adjusted under 35 U.S.C. 154(b) by 1268 days.

(21) Appl. No.: 11/215,860

(22) Filed: Aug. 30, 2005

(51) Int. Cl.
*G06F 13/12* (2006.01)
*G06F 17/00* (2006.01)
*G06F 3/048* (2006.01)
(52) U.S. Cl. .................... 710/72; 715/234; 715/765
(58) Field of Classification Search ............... 710/72; 715/234, 765
See application file for complete search history.

(56) References Cited

U.S. PATENT DOCUMENTS

| 5,948,091 | A  | * | 9/1999  | Kerigan et al. ............... 710/10 |
| 2002/0071055 | A1 | * | 6/2002  | Ooshima et al. ............ 348/552 |
| 2005/0019015 | A1 | * | 1/2005  | Ackley et al. ............... 386/95 |
| 2007/0250793 | A1 | * | 10/2007 | Miura et al. ................ 715/810 |

* cited by examiner

*Primary Examiner*—Niketa I Patel
(74) *Attorney, Agent, or Firm*—Marger Johnson & McCollom PC

(57) ABSTRACT

A display, possibly in combination with a computer, is used to manage the shape and position of various inputs, so that the inputs can be presented in combination. Possible combinations include displaying a subset of one input with another input, either overlapping or adjacent, displaying a temporal subset of one input, and using conditions to automatically control the selection of inputs.

67 Claims, 8 Drawing Sheets

PERSONALIZED MULTIMEDIA DISPLAY/DIGITAL TV FOR MULTI-TASKING

FIELD OF THE INVENTION

This invention pertains to displays, and more particularly to displays capable of presenting information from multiple sources.

BACKGROUND OF THE INVENTION

Television sets, despite the introduction of new technology, are relatively unchanged from the original incarnations. Whereas originally television sets received broadcasts via antenna, now coaxial cable and satellite dishes are more common, but the basic encoding of the information is relatively unchanged. The promise of digital television may reflect some change to the broadcast format, but it is difficult to say whether any actual change might come from digital television.

As a result, most of the technological improvements in televisions have been added to the sets themselves. For example, closed captioning provides viewers who have a difficult time hearing the audio the ability to understand what is being said. Television sets are migrating from the original cathode ray tube technology (CRT) to liquid crystal displays (LCDs) and plasma televisions, which offer large sets without requiring significant depth in the set. And picture-in-picture technology provides viewers with the ability to stay aware of two shows at the same.

But picture-in-picture technology offers relatively little. One program is displayed on the display; the second program is shown in a small window, which blocks the covered portion of the first program. Aside from selecting the two programs, the only control the user has over the technology is to position the window on the display. Regardless of the user's settings, a portion of the first program is blocked, and the second program fills the window (reduced in size to fit the window's dimensions, which makes viewing the program in the window almost unviewable).

Projectors have been around for quite some time. Historically, they projected only static images. The image to be projected would be placed a horizontal surface above a light source. Mirrors would then reflect the image onto a vertical surface parallel to the front of the projector, for easy viewing. The image could be raised or lowered by changing the angle of the mirror, and could be focused by raising or lowering the mirror (thereby changing the focal length of the projector).

In addition, many people are using displays to present information from computers: for example, the display can be connected to a computer acting as part of a media center. When displays are used in this manner, the user might want to use the display for both computing purposes and for television display. But, again, the technology is limited in its windowing capabilities, and in its ability to successfully switch between the two uses are needed.

Accordingly, a need remains for a way to use a display to control the presentation of information from multiple sources that addresses these and other problems associated with the prior art.

DETAILED DESCRIPTION OF THE PREFERRED EMBODIMENT

Figure 1:
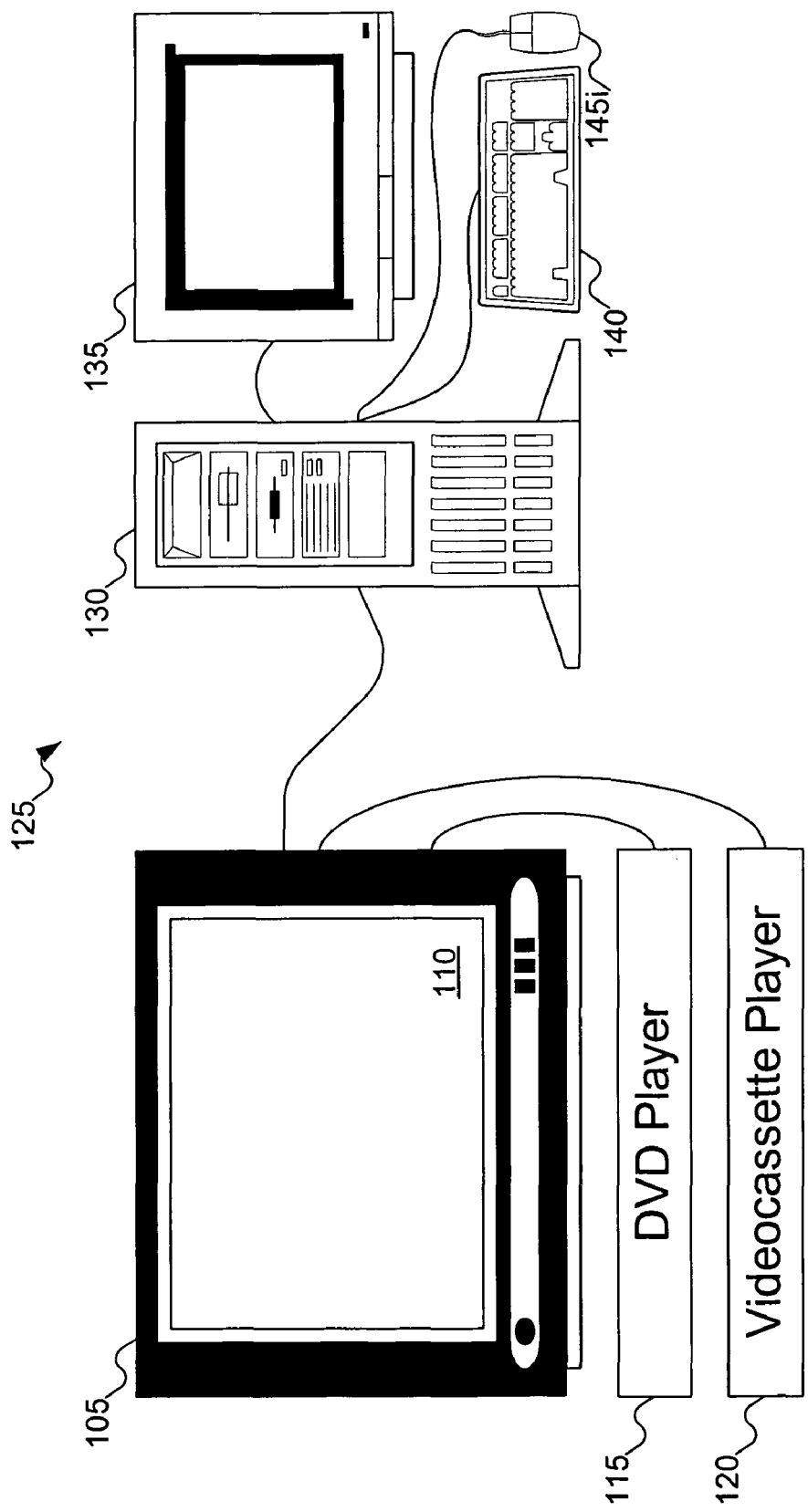
FIG. 1 shows a display adapted to support inputs from multiple sources, according to an embodiment of the invention.

FIG. 1 shows a display adapted to support inputs from multiple sources, according to an embodiment of the invention. In FIG. 1, display 105 is shown as a television set using a conventional cathode ray tube (CRT). But a person skilled in the art will recognize that embodiments of the invention are applicable to any variety of television: for example, liquid crystal displays (LCDs) or plasma displays. Display 105 includes screen 110 and is shown connected to Digital Video Disc (DVD) player 115 and videocassette player 120, but again, a person skilled in the art will recognize that display 105 can be connected to any other input sources. Examples of such sources can include coaxial cable or a satellite dish, a laserdisc player, or video from a handheld video recording device.

Display 105 is also shown connected to computer system 125. Computer system 125 is shown as including computer 130, monitor 135, keyboard 140, and mouse 145, but a person skilled in the art will recognize that computer system 125 can be replaced with any acceptable computer system. For example, computer system 125 might not include monitor 135, keyboard 140, or mouse 145. Or computer 130 might be a server rather than a person computer.

Figure 2:
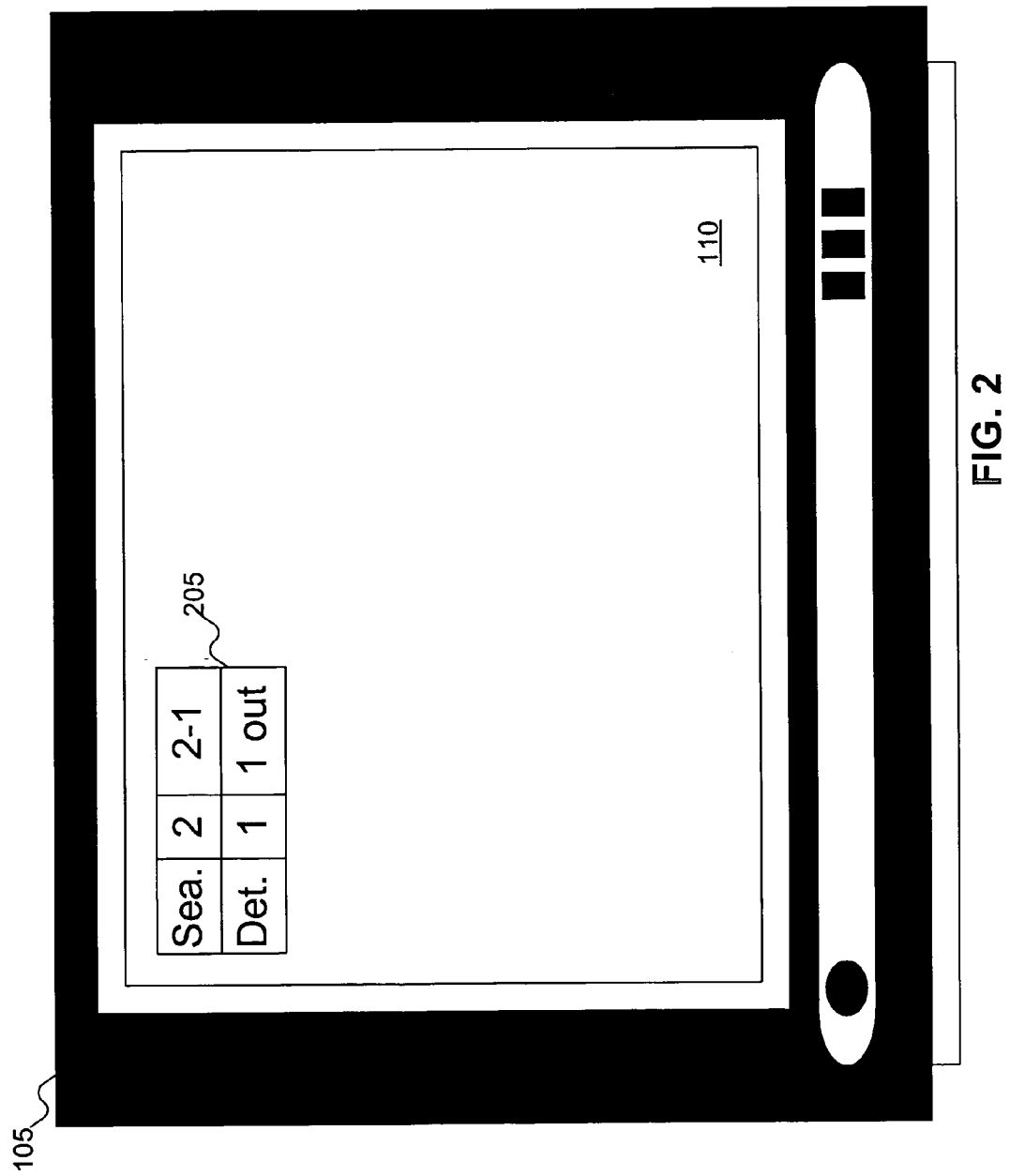
FIG. 2 shows the display of FIG. 1 presenting two inputs simultaneously, according to a first embodiment of the invention.
Figure 3:
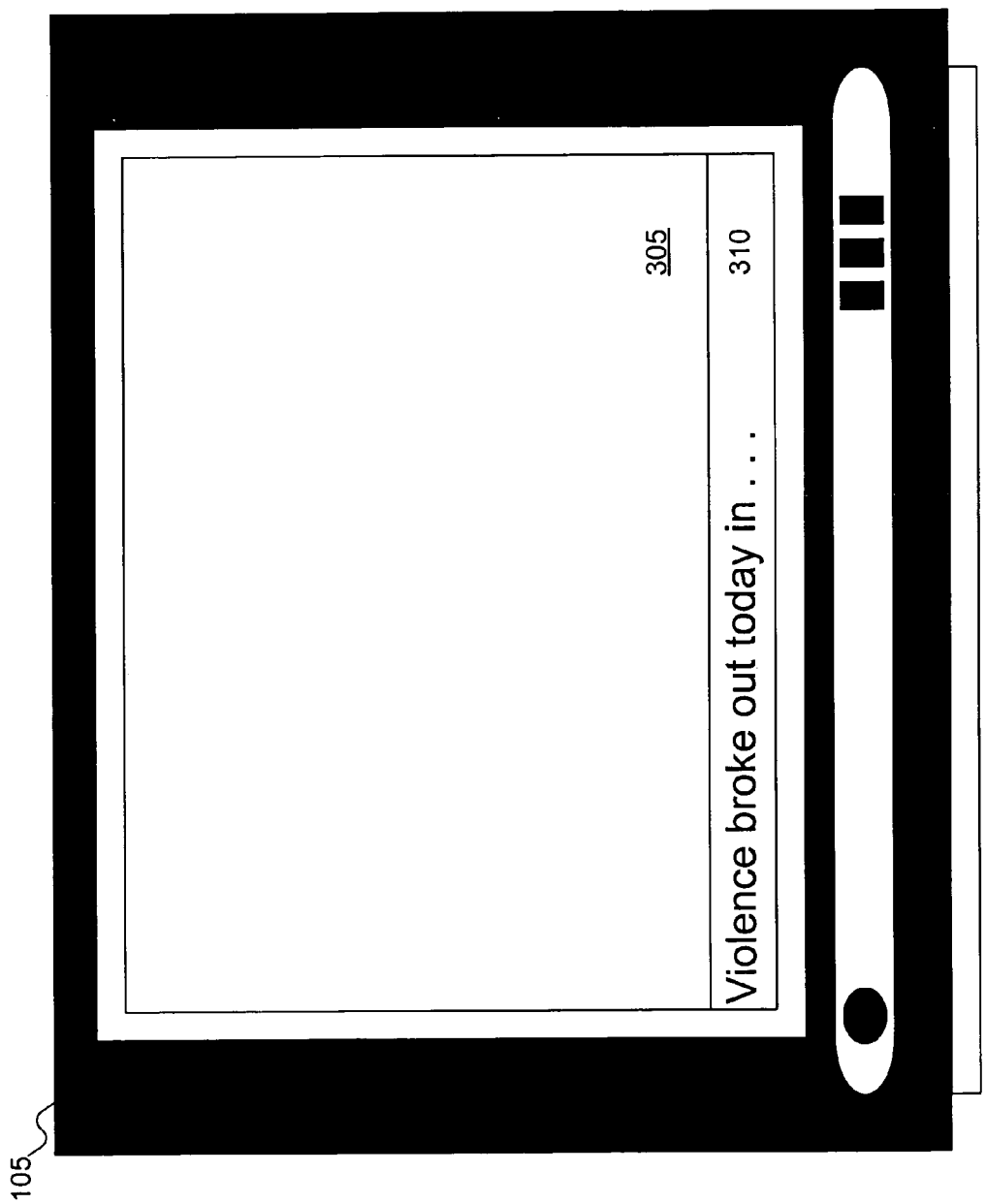
FIG. 3 shows the display of FIG. 1 presenting two inputs simultaneously, according to a second embodiment of the invention.

Regardless of the configuration of the components of the system, display 105 is adapted to show customized information to users. FIGS. 2-3 show examples of such customized displays. In FIG. 2, display 105 is using the entirety of screen 110 to display to show one program. On top of the program being displayed, window 205 is shown. But unlike regular picture-in-picture, where the windowed image shows the entirety of the second program, window 205 displays only a subset of the second program. In FIG. 2, the window shows the score from a baseball game, but a person skilled in the art will recognize that anything could be displayed in window 205.

In addition, the shape of window 205 is out of proportion to the dimensions of screen 110. This is because the user can change the shape of window 205. While window 205 is shown as a rectangle, any shape could be used, including polygons with differing numbers of sides, circles, ellipses, or any other desired shape, whether or not easily defined mathematically. The shape and position of the window can be set, for example, by the user selecting a desired shape from a list, then setting starting and ending positions on the screen. (For irregular shapes, the user can identify where the corners of the shape (if easily defined in those terms), or can "sketch" out the shape or overlay various standard patterns to define the shape.) The user can also easily re-position window 205. The user invokes the re-position function, which "grabs" window 205. The user can then move window 205 to a new position, and then "lock" the new position.

To display only a subset of the second program, the user simply identifies the part of the program to be displayed. Assuming the user has previously selected the shape of window 205, then the user can simply position the shape on screen 110 while display 105 is showing the second program. Once the part of the second program to display is selected, screen 110 can show the primary program, with window 205 showing the selected part of the second program. The user is free to later adjust the level of zoom within window 205, or to select a new part of the second program for display within window 205. In addition, selecting the portion of the program can be combined with setting the shape and position of the window, so that the user can select the part of the program to be display, the shape in which to display the selected part, and the position of the program in one step.

A person skilled in the art will recognize that all of these functions can be accomplished using a remote control. For example, to select a pre-defined shape (such as a rectangle) using a remote control, the user can press one or more buttons to invoke the windowing capability. The user can then use buttons on the remote control to position a cursor at one end of the shape and lock in that position. Next, the user uses the buttons to position the cursor at the other end of the shape, and locks in that position. The pre-defined shape is then used for window 205, in the size and position defined by the user. But a person skilled in the art will recognize that embodiments of the invention can use other means. For example, if display 105 is touch-sensitive, the user can accomplish these functions by touching screen 110 of display 105. Or, if display 105 is adapted to use a light pen, the user can use the light pen to carry out these functions.

FIG. 3 shows the display of FIG. 1 presenting two inputs simultaneously, according to a second embodiment of the invention. In FIG. 3, rather than having a window sitting on top of (and therefore covering) a portion of one program, the screen is divided into two portions 305 and 310. The positions and dimensions of the portions can be defined in the same manner as the shape and position of the window in FIG. 2. Further, portion 305, which shows the program of primary interest to the user, is adjusted to fit the dimensions of portion 305. Whether the adjustments are only in the vertical dimension (i.e., vertically compressed) or in both the vertical and horizontal dimensions (i.e., scaled to fit) is an option the user can select.

Portion 310, like the window of FIG. 2, shows only a subset of information from the second program. In FIG. 3, portion 310 is showing a "tickertape" with news information: for example, from a news program. But a person skilled in the art will recognize that any information can be displayed within portion 310. The selection of the subset of the second program within portion 310 is accomplished in the same manner as the selection of the subset of the second program as described above with reference to FIG. 2.

Returning to FIG. 1, in one embodiment of the invention management of these functions of display 105 is handled by computer system 125. In this embodiment, computer system 125 is used to control the selected subset of the second program, the shape and position of the window or screen portions, and the level of zoom: for example, using software. This can be handled in a number of ways. For example, display 105 can forward as appropriate the various inputs to computer system 125. Computer system 125 can then manage the composition of what the user wants displayed, and return to display 105 the information to show, either by forwarding to display 105 the data to display or instructing display 105 as to what to display and how. In another embodiment, computer system 125 only manages the selection of the subset of the second program and the shape and position of the window or screen portions, and leaves it to display 105 to compose the final screen presentation. In yet another embodiment, management of these functions is handled within display 105. In this latter embodiment, computer system 125 is not necessary, although computer system 125 can still be connected to display 105.

One reason to connect computer system 125 is to use display 105 in place of monitor 135: that is, to use display 105 to show whatever information computer system 125 needs to display. Computer system 125 thus acts as one input source for display 105. When using display 105 in this manner, either computer system 125 or display 105 can control the presentation of information.

In another variation, the information shown on display 105 from one of the inputs is not present on screen all the time, but rather when certain conditions are met. In other words, the subset of information presented to the user is not only a subset of all the input from the input source, but a temporal subset as well (the input source is presented only part of the time). For example, consider the situation where a user is using display 105 both to view an input source for entertainment, and to display information from computer system 125, and assume the user is running an application on computer system 125. The application might be able to run unattended for a while. Keeping a window open would allow the user to monitor the application. But if the application does not require any attendance, the window would only be a distraction and unnecessarily use up screen space. So, the user would ideally prefer to dedicate display 105 to showing the entertainment from the other input source. But if the application posts a pop-up dialog box, the application might have to wait until the user addresses whatever situation is indicated by the dialog box. If the user only finds out about the dialog box when he manually switches to the output of computer system 125, the application might have to wait a considerable time for input.

This is where temporal subset of input is useful. Display 105 shows the selected entertainment until the other input source (in this example, computer system 125) has information that the user needs to see. What conditions might define important information like this can be handled in several different ways: for example, computer system 125 can send a signal to display 105 indicating that priority information needs to be displayed, or the user can (in some way) define the conditions that would prompt presentation of the other input source. In any event, when display 105 realizes that there is priority information to show, display 105 can automatically present the priority information. Display 105 can present the priority information either by completely switching to the other input source, or by opening a window to present the information without completely blocking the first program.

An example of another condition that display 105 can use to control information presentation involves commercials. Commercials take up more than ¼ of broadcast time on most channels. Assume for example that a user has specified two input sources, one of which is commercial television (the input source could be a broadcast signal, a coaxial cable, or a satellite dish, among other possibilities). When the commercial television show is on, display 105 can show the program (e.g., in its entirety on screen 110). When the program goes to commercial, display 105 can switch to the other input source. Then, when the commercials end and the program returns, display 105 can switch back to the first input source, showing the user the commercial television program.

Figure 4:
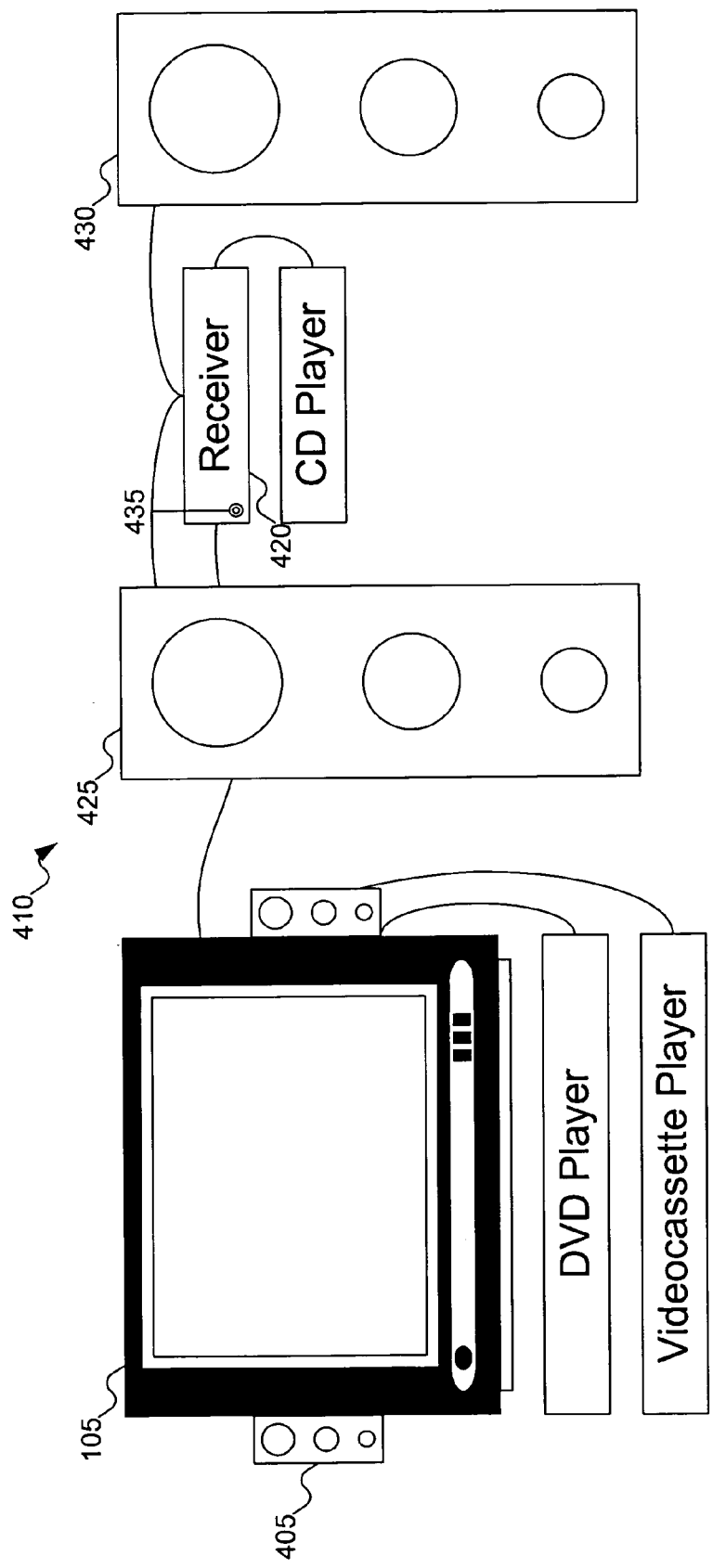
FIG. 4 shows the display of FIG. 1 in a home entertainment system setting.

In yet another embodiment, the various input sources include multiple media. Display 105 can be adapted to direct each media from the input source to a particular destination. For example, television signals include both video and audio components. Display 105 can not only set up screen 110 to show the programs in a customized manner, but also to redirect audio to different destinations. In FIG. 4, display 105 is shown as having built-in speakers 405, also being connected to stereo system 410. Stereo system 415 includes, among other components, receiver 420 and speakers 425 and 430. For the program that is displayed as the primary program on the screen, display 105 can direct the audio to speakers, such as built-in speakers 405. For the audio that is associated with the secondary program, this audio can be directed to a secondary audio destination, such as headphone jack 435. This enables both users to watch their programs without interruption. (Of course, embodiments of the invention are not limited to audio and video mediums, nor are they limited to directing the audio for the programs as described. For example, assuming display 105 has a headphone jack or a wireless headphone means, the audio associated with the primary program can be directed to speakers 425 and 430, and the audio associated with the secondary program can be directed to the headphone jack or wireless headphone means built into display 105.)

The embodiments described above can also be combined. For example, the user might have the majority of screen 110 display input from DVD player 115. Covering a portion of screen 110 is a window, showing a program from a composite input source, such as television, where there are multiple signals (e.g., multiple channels) combined within a single input source. When the television program goes to commercial, display 105 can switch the window to show a second program from the composite input source, and return to the first program when the commercial ends.

Figure 5:
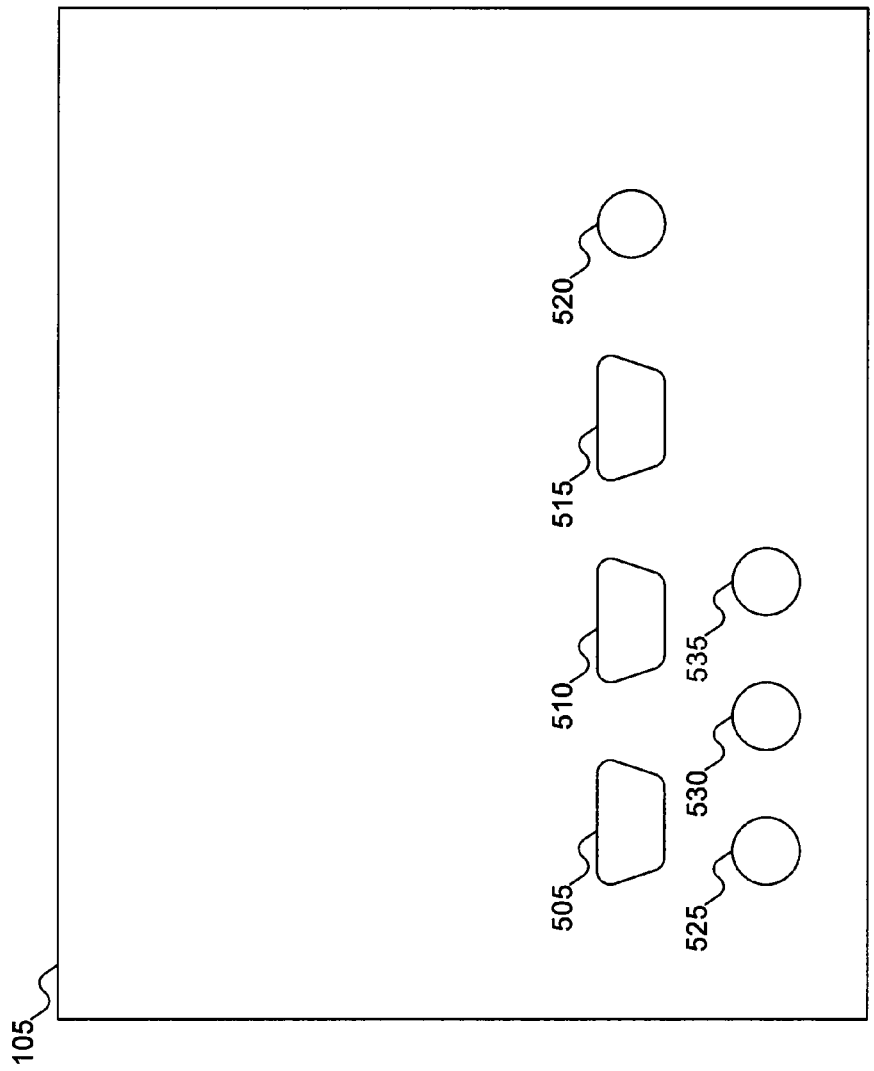
FIG. 5 shows inputs to the display of FIG. 1.

FIG. 5 shows the inputs to the display of FIG. 1. FIG. 5 shows connectors 505, 510, and 515, which can be connectors for a DVD player, a videocassette player, and a personal computer. Connector 520 is for a coaxial cable connection (e.g., from a cable company or a satellite broadcaster). Connector 525 is for a connection with a speaker system, and connector 530 is for headphones (e.g., a ⅛" microphone jack). Finally, connector 535 is not designed for a specific input source, but can be used for an auxiliary input.

A person skilled in the art will recognize that the connectors shown in FIG. 5 are stylized versions of various connectors, and that connections can be made using differently shaped connectors. In addition, a person skilled in the art will recognize that display 105 can include multiple connectors for connecting display 105 with a single device. For example, using a composite video cable and stereo audio cables, there could be three connectors for a single device to communicate with display 105. And using component video, there would be even more connectors for a single device.

Typically, the inputs shown in FIG. 5 are on the back of display 105, but a person skilled in the art will recognize that the inputs can be anywhere on display 105. In addition, while FIG. 5 shows physical connectors for display 105, a person skilled in the art will recognize that some or all of the connections could be made wirelessly, with just the appropriate receivers built in to display 105.

Figure 6:
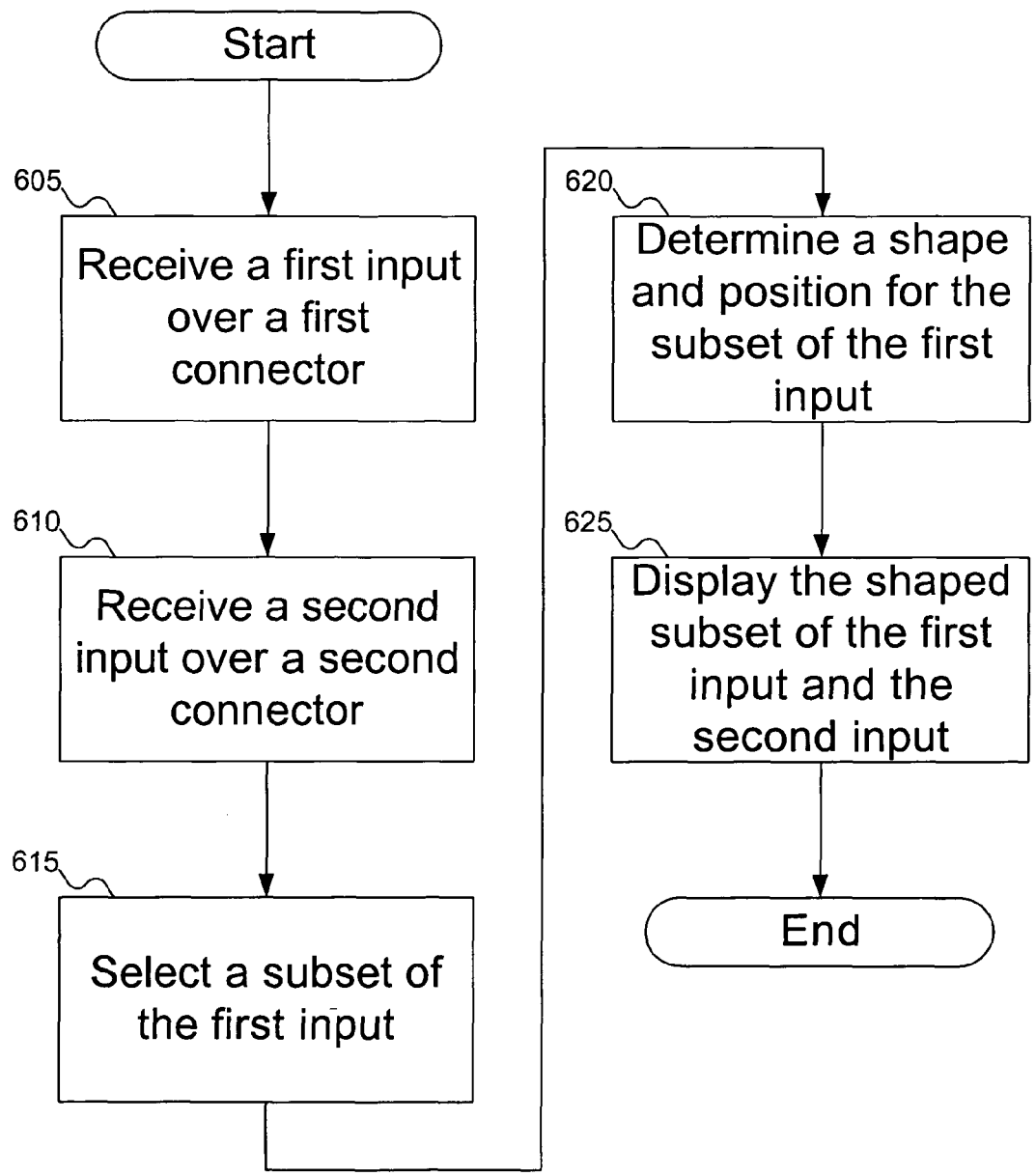
FIG. 6 shows a flowchart of the procedure for using the display of FIG. 1 to present two inputs simultaneously.

FIG. 6 shows a flowchart of the procedure for using the display of FIG. 1 to present two inputs simultaneously. In FIG. 6, at step 605, the system receives a first input over a first connector, and at step 610, the system receives a second input over a second connector. At step 615, the system selects a subset of the first input. As described above, this subset can be of any shape, and can be a temporal subset (where the data from the first input is displayed only some of the time). At step 620, a shape and position for the subset is determined. As discussed above, steps 615-620 can be done simultaneously, or in any preferred order. Finally, at step 625, the system displays the shaped subset of the first input and the second input.

Figure 7:
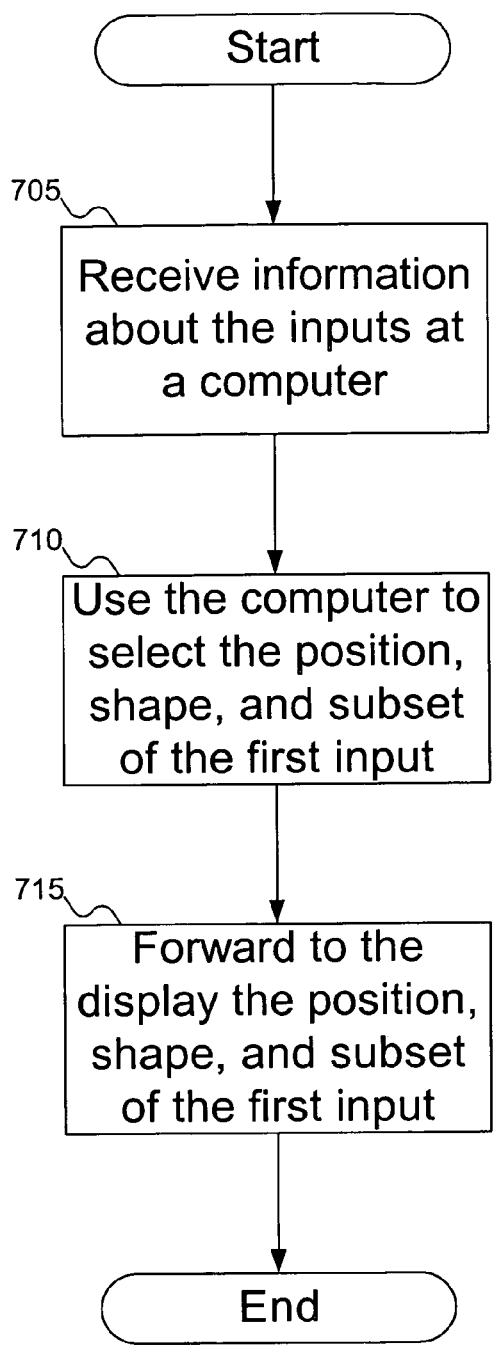
FIG. 7 shows a flowchart of the procedure used by a computer to control the display of FIG. 1.

FIG. 7 shows a flowchart of the procedure used by a computer to control the display of FIG. 1. In FIG. 7, at step 705, the computer receives information about the inputs. This can be either by the display forwarding the inputs to the computer, or informing the computer about the inputs (but without forwarding the inputs). Of course, the computer itself can also be one of the inputs: in that case, the display does not need to forward anything to the computer. At step 710, the computer is used to select the subset of the input, and the shape and position of the subset. Finally, at step 715, the computer forwards to the display the subset of the first input to display, and the shape and position for the subset of the first input. As discussed above, the computer can actually act as a filter for the inputs and provide the display with the data to show, or can instruct the display as to what to display and how to display it.

Figure 8:
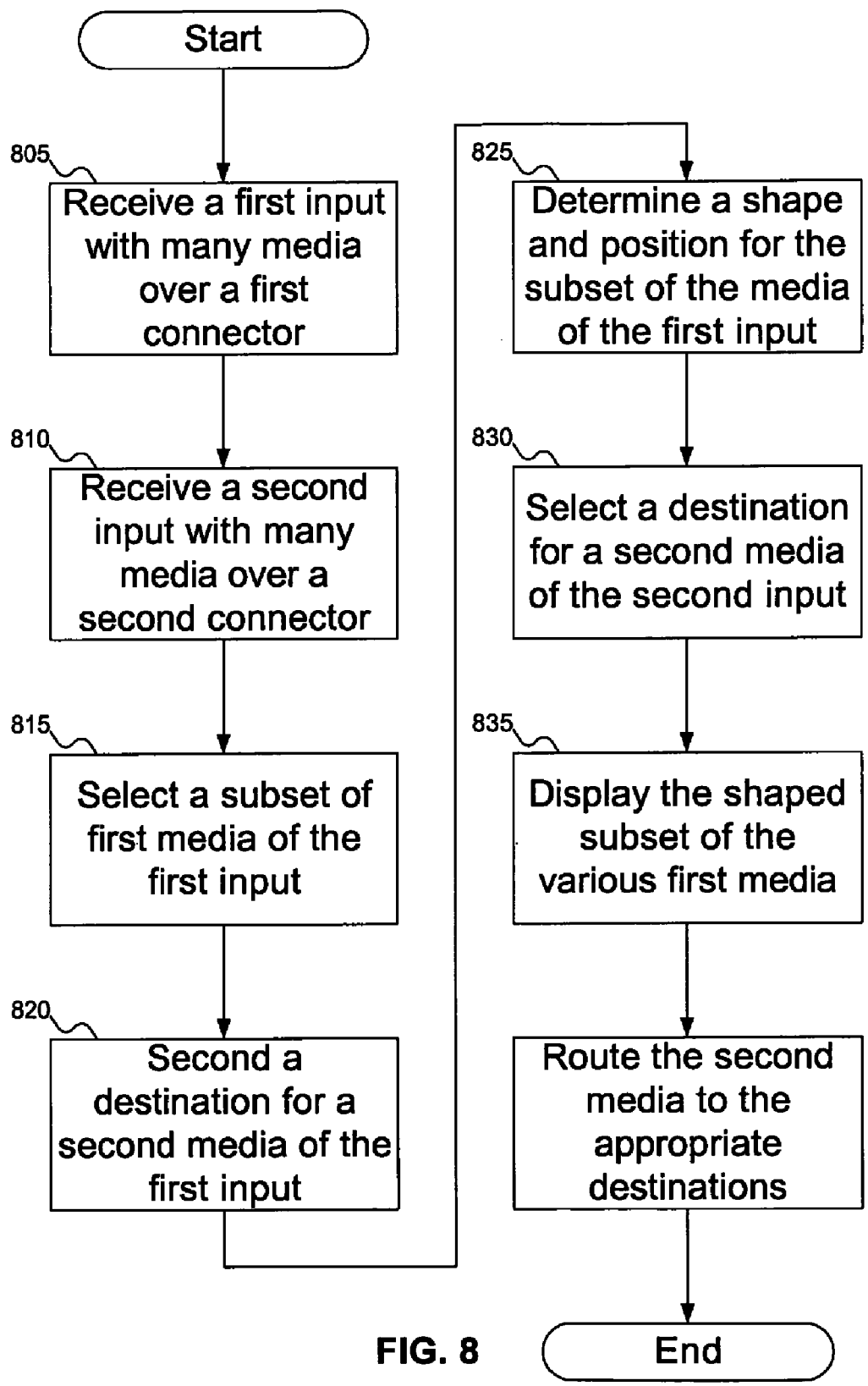
FIG. 8 shows a flowchart of the procedure for using the display of FIG. 1 to direct multiple inputs to multiple destinations simultaneously.

FIG. 8 shows a flowchart of the procedure for using the display of FIG. 1 to direct multiple inputs to multiple destinations simultaneously. At step 805, the system receives a first input that includes multiple media. At step 810, the system receives a second input that includes multiple media. At step 815, the system is used to select a subset of one of the media in the first input. At step 820, the system is used to select a destination for a second media in the first input. At step 825, the system determines a shape and position for the subset of the first media. At step 830, the system is used to select destinations for media in the second input. At step 835, the system displays the first media of the various inputs, and at step 840 the system routes the second media to the various destinations.

The following discussion is intended to provide a brief, general description of a suitable machine (i.e., projector) in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A system, comprising:
   a display;
   a first connector on the display to receive a first input from a first input source, the first input including a first plurality of mediums;
   a second connector on the display to receive a second input from a second input source, the second input including a second plurality of mediums;
   means for customizing a presentation of a first medium of the first input and a second medium of the second input on the display to permit display of a subset of the first medium of the first input and the second medium of the second input;
   means for directing a third medium of the first input to a first destination other than the display; and
   means for directing a fourth medium of the second input to a second destination other than the display.

2. A system according to claim 1, wherein the means for customizing includes means for customizing a shape of the subset of the first medium of the first input in the display of the subset of the first medium of the first input and of the second medium of the second input, the shape of the subset of the first medium of the first input in the display being drawn from a set including at least one non-rectangular shape.

3. A system according to claim 1, wherein the means for customizing is designed to specify the selection and shape of the subset of the first medium of the first input without continuous access to the first input, the shape of the subset of the first medium of the first input being drawn from a set including at least one non-rectangular shape.

4. A system according to claim 1, wherein the means for customizing includes means for displaying a temporal subset of the first input.

5. A system according to claim 1, wherein:
   the first input includes at least a first signal and a second signal, each of the first and second signals including a plurality of mediums;
   the display includes a signal selector to select one of the first signal and the second signal for presentation; and
   the means for customizing includes means for changing the signal selector if an event happens.

6. A system according to claim 5, further comprising means for identifying a preference between the first signal and the second signal.

7. A system according to claim 5, wherein the event is drawn from a set including an application posting a pop-up dialog box, the start of a commercial, and the end of a commercial.

8. A system according to claim 1, wherein the means for customizing a presentation of the first input and the second input includes:
   means for changing a first size and shape for presentation of the subset the first input; and
   means for changing a second size and shape for presentation of the second input.

9. A system according to claim 1, further comprising:
   a computer including the means for customizing; and
   a communication channel between the computer and the display.

10. A system according to claim 9, wherein the means for customizing includes software to control the selection and shape of presentation of the subset of the first medium of the first input, the shape of the presentation being drawn from a set including at least one non-rectangular shape.

11. A system according to claim 9, wherein the first connector receives the communication channel.

12. A system according to claim 11, wherein the display is designed to forward the second input over the second connector to the computer via the communication channel over the first connector.

13. A system according to claim 9, wherein:
   the communication channel is distinct from the first connector and the second connector; and
   the display is designed to forward the first medium of the first input over the first connection and the second medium of the second input over the second connector to the computer via the communication channel.

14. A method for using a display, comprising:
   receiving a first plurality of mediums in a first input over a first connector on the display;
   receiving a second plurality of mediums in a second input over a second connector on the display;
   selecting a subset of a first medium of the first input for presentation on the display;
   determining a shape for the subset of the first input, the shape drawn from a set including at least one non-rectangular shape;
   displaying the shaped subset of the first medium and a second medium of the second plurality of mediums on the display;
   directing a third medium of the first plurality of mediums to a second destination other than the display; and
   directing a fourth medium of the second plurality of mediums to a third destination other than the display.

15. A method according to claim 14, wherein determining a shape includes determining a position for the shaped subset of the first medium of the first input.

16. A method according to claim 14, wherein selecting a subset includes selecting a temporal subset of the first input.

17. A method according to claim 14, wherein:
   receiving a first input includes:
      receiving at least a first signal and a second signal in the first input, each of the first and second signals including a plurality of mediums; and
      selecting the first signal in the first input for presentation; and
   selecting a subset of the first input includes changing from the first signal to the second signal in the presentation if an event happens.

18. A method according to claim 17, wherein receiving a first input further includes receiving a preference between the first signal and the second signal in the first input.

19. A method according to claim 17, wherein selecting a subset of the first input includes changing from the first signal to the second signal in the presentation if an event happens includes selecting a subset of the first input includes changing from the first signal to the second signal in the presentation if an event happens, the event drawn from a set including an application posting a pop-up dialog box, the start of a commercial, and the end of a commercial.

20. A method according to claim 14, wherein:
   the method further comprises determining a shape for the second input; and
   displaying the shaped subset of the first input and the second input on the display includes displaying the shaped subset of the first input and the shaped second input on the display.

21. A method according to claim 14, wherein selecting a subset of the first input includes:
   communicating with a computer over a communication channel; and
   selecting a subset of the first input using the computer.

22. A method according to claim 21, wherein communicating with a computer includes communicating with the computer over the first connector.

23. A method according to claim 22, wherein forwarding the second input to the computer includes forwarding the second medium of the second input to the computer over the first connector.

24. A method according to claim 21, wherein communicating with a computer includes forwarding the first medium of the first input and the second medium of the second input to the computer over the communication channel.

25. An article comprising a machine-accessible storage media having associated data, wherein the data, when accessed, results in a machine performing:
   receiving information about a first input from a display over a communication channel, the first input including a first plurality of mediums;
   selecting a subset of a first medium the first input;
   determining a shape for the subset of the first medium of the first input, the shape drawn from a set including at least one non-rectangular shape;
   instructing the display to present the shaped subset of the first medium of the first input and a second medium from a second plurality of mediums in a second input;
   receiving the second input from the display over the communication channel;
   indicating that a third medium from the first plurality of mediums be directed to a first destination other than the display; and
   indicating that a fourth medium from the second plurality of mediums be directed to a second destination other than the display.

26. An article according to claim 25, wherein determining a shape includes determining a position for the shaped subset of the first medium of the first input.

27. An article according to claim 25, wherein selecting a subset includes selecting a temporal subset of the first input.

28. An article according to claim 25, wherein instructing a display to present the shaped subset of the first medium of the first input and a second medium from a second plurality of mediums in a second input includes displaying the shaped subset of the first medium of the first input and the second medium of the second input on the display.

29. An article according to claim 25, wherein selecting a subset of a first input includes:
   selecting a subset of a first signal from a plurality of signals in the first input in the first input for presentation, each of the plurality of signals including a plurality of mediums; and
   selecting a subset of the first input includes changing from the first signal to the second signal in the presentation if an event happens.

30. An article according to claim 29, wherein selecting a subset of a first signal from a plurality of signals in the first input in the first input for presentation includes receiving a preference between the first signal and the second signal in the first input.

31. An article according to claim 29, wherein selecting a subset of the first input includes changing from the first signal to the second signal in the presentation if an event happens includes selecting a subset of the first input includes changing from the first signal to the second signal in the presentation if an event happens, the event drawn from a set including an application posting a pop-up dialog box, the start of a commercial, and the end of a commercial.

32. An article according to claim 25, wherein:
   the machine-accessible data further including associated data that, when accessed, results in determining a shape for the second input; and
   displaying the shaped subset of the first input and the second input on the display includes displaying the shaped subset of the first input and the shaped second input on the display.

33. An article according to claim 25, wherein selecting a subset of a first input includes receiving information about the first input over a communication channel.

34. An article according to claim 33, the machine-accessible data further including associated data that, when accessed, result in receiving the second input over the communication channel.

35. An article according to claim 33, wherein receiving information about the first input includes receiving the first input over the communication channel.

36. A system, comprising:
   a display;
   a first connector on the display to receive a first input from a first input source the first input including at least a first signal and a second signal;
   a signal selector included in the display to select one of the first signal and the second signal for presentation;
   a second connector on the display to receive a second input from a second input source;
   means for customizing a presentation of the first input and the second input on the display to permit display of a subset of the first input and the second input; and
   means for changing the signal selector if an event happens.

37. A system according to claim 36, wherein the means for customizing includes means for customizing a shape of the subset of the first input in the display of a subset of the first input and the second input, the shape of the subset of the first input in the display being drawn from a set including at least one non-rectangular shape.

38. A system according to claim 36, further comprising:
a computer including the means for customizing; and
a communication channel between the computer and the display.

39. A system according to claim 38, wherein the means for customizing includes software to control the selection and shape of presentation of the subset of the first input, the shape of the presentation being drawn from a set including at least one non-rectangular shape.

40. A system according to claim 38, wherein the first connector receives the communication channel.

41. A system according to claim 38, wherein the display is designed to forward the second input over the second connector to the computer via the communication channel over the first connector.

42. A system according to claim 38, wherein:
the communication channel is distinct from the first connector and the second connector; and
the display is designed to forward the first input over the first connection and the second input over the second connector to the computer via the communication channel.

43. A system according to claim 36, wherein the means for customizing is designed to specify the selection and shape of the subset of the first input without continuous access to the first input, the shape of the subset of the first input being drawn from a set including at least one non-rectangular shape.

44. A system according to claim 36, wherein the means for customizing includes means for displaying a temporal subset of the first input.

45. A system according to claim 36, further comprising means for identifying a preference between the first signal and the second signal.

46. A system according to claim 36, wherein the means for customizing a presentation of the first input and the second input includes:
means for changing a first size and shape for presentation of the subset the first input; and
means for changing a second size and shape for presentation of the second input.

47. A system according to claim 36, wherein the event is drawn from a set including an application posting a pop-up dialog box, the start of a commercial, and the end of a commercial.

48. A method for using a display, comprising:
receiving at least a first signal and a second signal in a first input over a first connector on the display;
selecting the first signal in the first input for presentation;
receiving a second input over a second connector on the display;
selecting a subset of the first input, including changing from the first signal to the second signal in the presentation if an event happens;
determining a shape for the subset of the first input, the shape drawn from a set including at least one non-rectangular shape; and
displaying the shaped subset of the first input and the second input on the display.

49. A method according to claim 48, wherein determining a shape includes determining a position for the shaped subset of the first input.

50. A method according to claim 48, wherein selecting a subset includes selecting a temporal subset of the first input.

51. A method according to claim 48, wherein selecting a subset of the first input includes:
communicating with a computer over a communication channel; and
selecting a subset of the first input using the computer.

52. A method according to claim 51, wherein communicating with a computer includes forwarding the first input and the second input to the computer over the communication channel.

53. A method according to claim 51, wherein communicating with a computer includes communicating with the computer over the first connector.

54. A method according to claim 53, wherein selecting a subset of the first input further includes forwarding the second input to the computer over the first connector.

55. A method according to claim 48, wherein receiving a first input further includes receiving a preference between the first signal and the second signal in the first input.

56. A method according to claim 48, wherein:
the method further comprises determining a shape for the second input; and
displaying the shaped subset of the first input and the second input on the display includes displaying the shaped subset of the first input and the shaped second input on the display.

57. A method according to claim 48, wherein selecting a subset of the first input includes changing from the first signal to the second signal in the presentation if an event happens includes selecting a subset of the first input includes changing from the first signal to the second signal in the presentation if an event happens, the event drawn from a set including an application posting a pop-up dialog box, the start of a commercial, and the end of a commercial.

58. An article comprising a machine-accessible storage media having associated data, wherein the data, when accessed, results in a machine performing:
selecting a subset of a first signal from a plurality of signals in a first input for presentation, including changing from the first signal to a second signal in the presentation if an event happens;
determining a shape for the subset of the first input, the shape drawn from a set including at least one non-rectangular shape; and
instructing a display to present the shaped subset of the first input and a second input.

59. An article according to claim 58, wherein determining a shape includes determining a position for the shaped subset of the first input.

60. An article according to claim 58, wherein selecting a subset includes selecting a temporal subset of the first input.

61. An article according to claim 58, wherein selecting a subset of a first input includes receiving information about the first input over a communication channel.

62. An article according to claim 61, wherein receiving information about the first input includes receiving the first input over the communication channel.

63. An article according to claim 61, the machine-accessible data further including associated data that, when accessed, result in receiving the second input over the communication channel.

64. An article according to claim 58, wherein instructing a display to present the shaped subset of the first input and a second input includes displaying the shaped subset of the first input and a second input on the display.

65. An article according to claim 58, wherein selecting a subset of a first signal from a plurality of signals in the first input in the first input for presentation includes receiving a preference between the first signal and the second signal in the first input.

66. An article according to claim 58, wherein:
- the machine-accessible data further including associated data that, when accessed, results in determining a shape for the second input; and
- displaying the shaped subset of the first input and the second input on the display includes displaying the shaped subset of the first input and the shaped second input on the display.

67. An article according to claim 58, wherein selecting a subset of the first input includes changing from the first signal to the second signal in the presentation if an event happens includes selecting a subset of the first input includes changing from the first signal to the second signal in the presentation if an event happens, the event drawn from a set including an application posting a pop-up dialog box, the start of a commercial, and the end of a commercial.

\* \* \* \* \*

UNITED STATES PATENT AND TRADEMARK OFFICE
CERTIFICATE OF CORRECTION

PATENT NO. : 7,793,018 B1
APPLICATION NO. : 11/215860
DATED : September 7, 2010
INVENTOR(S) : Tianbing Brian Teng et al.

It is certified that error appears in the above-identified patent and that said Letters Patent is hereby corrected as shown below:

Column 7, line 12, the words "may be" should read -- may also be --;
Column 11, line 15, the word "38" should read -- 40 --.

Signed and Sealed this

Thirtieth Day of November, 2010

David J. Kappos
*Director of the United States Patent and Trademark Office*